(12) United States Patent
Harikrishnan et al.

(10) Patent No.: US 9,133,319 B2
(45) Date of Patent: Sep. 15, 2015

(54) CLAY-ISOCYANATE NANODISPERSIONS AND POLYURETHANE NANOCOMPOSITE PRODUCED THEREWITH

(75) Inventors: G. Harikrishnan, Minneapolis, MN (US); Christopher Ward Macosko, Minneapolis, MN (US); Christopher Ian Lindsay, Tervuren (BE); Sachchida Nand Singh, Moorestown, NJ (US)

(73) Assignees: Huntsman International LLC, The Woodlands, TX (US); Regents of the University of Minnesota, Saint Paul, MN (US)

(*) Notice: Subject to any disclaimer, the term of this patent is extended or adjusted under 35 U.S.C. 154(b) by 277 days.

(21) Appl. No.: 12/989,725

(22) PCT Filed: May 6, 2009

(86) PCT No.: PCT/US2009/042923
§ 371 (c)(1),
(2), (4) Date: Oct. 26, 2010

(87) PCT Pub. No.: WO2009/137539
PCT Pub. Date: Nov. 12, 2009

(65) Prior Publication Data
US 2011/0046287 A1 Feb. 24, 2011

Related U.S. Application Data

(60) Provisional application No. 61/050,844, filed on May 6, 2008.

(51) Int. Cl.
*C08G 18/76* (2006.01)
*C08K 3/34* (2006.01)
(Continued)

(52) U.S. Cl.
CPC .............. *C08K 3/346* (2013.01); *B82Y 30/00* (2013.01); *C04B 33/04* (2013.01);
(Continued)

(58) Field of Classification Search
CPC .............. C08G 18/06; C08G 18/72; C08G 2101/0025; C08K 3/346; C08J 2205/10; C08J 2375/04; C08J 2475/04
USPC .................................. 524/445–447
See application file for complete search history.

(56) References Cited

U.S. PATENT DOCUMENTS 3,015,626 A * 1/1962 Kingsbury ............... 252/62
3,256,218 A * 6/1966 Knox ..................... 521/54
(Continued)

FOREIGN PATENT DOCUMENTS

GB 2400107 A * 10/2004
WO WO 2005082993 A1 * 9/2005

OTHER PUBLICATIONS

Suvorov (Vermiculite-A Promising Material for High-Temperature Heat Insulators. Refractories and Industrial Ceramics. 2003, 44(3), 186-193).*
(Continued)

*Primary Examiner* — Brieann R Fink
(74) *Attorney, Agent, or Firm* — Robert A. Diaz

(57) ABSTRACT

Nanodispersions of inorganic clays in isocyanate may be created via pre-exfoliation, delamination, or both of the clay and subsequent mixing with isocyanate. In an embodiment, such an isocyanate nanodispersion is reacted with an isocyanate-reactive material or substrate to form a polyurethane nanocomposite.

26 Claims, 4 Drawing Sheets

(51) Int. Cl.
*C04B 33/04* (2006.01)
*C08G 18/48* (2006.01)
*B82Y 30/00* (2011.01)
*C08G 101/00* (2006.01)

(52) U.S. Cl.
CPC ....... *C08G 18/4883* (2013.01); *C08G 18/7664* (2013.01); *C08G 2101/0025* (2013.01); *C08J 2205/10* (2013.01); *C08J 2375/04* (2013.01); *C08J 2475/04* (2013.01)

(56) References Cited

U.S. PATENT DOCUMENTS

| | | | | |
|---|---|---|---|---|
| 4,094,869 | A * | 6/1978 | Biranowski et al. | 521/118 |
| 4,400,297 | A | 8/1983 | Cruz, Jr. | |
| 4,818,435 | A * | 4/1989 | Lukacs, III | 252/378 R |
| 4,826,628 | A | 5/1989 | Rittler | |
| 5,107,027 | A * | 4/1992 | Knifton et al. | 564/485 |
| 5,705,444 | A * | 1/1998 | Tompkins et al. | 442/76 |
| 6,337,107 | B1 * | 1/2002 | Symons | 264/122 |
| 6,518,324 | B1 * | 2/2003 | Kresta et al. | 521/83 |
| 7,592,387 | B2 * | 9/2009 | Kim et al. | 524/445 |
| 2004/0241427 | A1 * | 12/2004 | Zhu et al. | 428/328 |
| 2005/0038167 | A1 * | 2/2005 | Plummer et al. | 524/445 |
| 2005/0059765 | A1 * | 3/2005 | Finch et al. | 524/430 |
| 2007/0072991 | A1 | 3/2007 | Jana et al. | |
| 2007/0197709 | A1 | 8/2007 | Kim et al. | |
| 2007/0227748 | A1 * | 10/2007 | Liggat et al. | 169/45 |
| 2008/0009568 | A1 * | 1/2008 | Kumar et al. | 524/80 |

OTHER PUBLICATIONS

G. Harikrishnan, T. Umasankar Patro, and D. V. Khakhar, "Polyurethane Foam—Clay Nanocomposites : Nanoclays as Cell Openers", *Ind. Eng. Chem. Res.* 2006, 45, 7126-7134.

Akane Okada, Arimitsu Usuki, "Twenty Years of Polymer-Clay Nanocomposites" *Macromolecular Materials and Engineering* 2006, 291, 1449-1476.

H. G. Midgley and C. M. Midgley "The Mineralogy of some Commercial Vermicultes" *Clay Min. Bull* 4(23) : 142-150.

P. Couderc, and PH. Douillet, "Les vermiculites industrielles : exfoliation, caracteristiques mineralogiques et chimiques" *Bull. Soc. Fr. Ceram.* 99 : 51-59.

Widya, Tomy et al.; "Nanoclay-Modified Rigid Polyurethane Foam"; Journal of Macromolecular Science®, Part B: Physics; vol. 44 No. 6; pp. 897-908; Nov. 2005.

Mondal, Pravakar et al.; "Rigid Polyurethane-Clay Nanocomposite Foams: Preparation and Properties"; Journal of Applied Polymer Science; vol. 103, pp. 2802-2809; Jan. 2007.

* cited by examiner

US 9,133,319 B2

CLAY-ISOCYANATE NANODISPERSIONS AND POLYURETHANE NANOCOMPOSITE PRODUCED THEREWITH

CROSS-REFERENCE TO RELATED APPLICATIONS

This application is the National Phase of International Application PCT/US2009/042923 filed May 6, 2009 which designated the U.S. and which claims priority to U.S. Provisional App. Ser. No. 61/050,844 filed May 6, 2008. The noted applications are incorporated herein by reference.

TECHNICAL FIELD

This disclosure relates generally to nanodispersions of inorganic clays, and more specifically to nanodispersions of inorganic clays in isocyanate and polyurethane nanocomposites produced therewith.

BACKGROUND

A wide variety of products are manufactured from polyurethanes such as shoe soles, automotive seats, abrasion resistant coatings, oriented strand board, and door panels just to name a few. In most, if not all, of these applications isocyanate is reacted with one or more isocyanate reactive materials such as polyols, polyamines, and ligno-cellulose. Other materials may be added to the reaction mixture such as catalysts, fire retardants, blowing agents, water, surfactants, and filler as a few examples.

To meet the needs of a particular application, the isocyanate, isocyanate-reactive material, and other additives, if used, can be tailored with remarkable accuracy. For example, polyurethane systems may be tailored to produce closed cell rigid foams such as those used as insulation in buildings and appliances; open celled flexible foams such as those used as cushioning and sound absorbing materials in automotive, furniture, and bedding; elastomers such as those used in footwear, sports equipment, and industrial applications; fiber reinforced composites that may be use in automotive, aerospace, and household applications; coatings such as those used in automotives, floors, and bridges; adhesives which may be used in composite wood products and flexible packaging; and sealants and encapsulants that may be used in construction and automotive.

Polyurethane versatility is also due to the ease with which products are made. For instance, polymerization may take place during formation of the final article, which gives the processor the ability to change and control the nature and the properties of the final product. The tailoring ability and ease of fabrication give an enormous cost-performance advantage to polyurethane-based products and are the key reasons behind its remarkable industrial success over the last four decades.

Although number of different types of polyurethane products, each with its own unique properties, is remarkable, cost-performance may be improved by adding nanoparticles such as clay nanoparticles to polyurethane systems to form polymer nanocomposites. Polyurethanes made with nanoparticles may exhibit property enhancements beyond those possible with traditional, micron or higher sized additives.

To make a polymer nanocomposite with improvements in properties at relatively low nanoclay content, the nanoclay should be uniformly dispersed in the polymer matrix. One challenge to making such a nanocomposite is to separate or delaminate the smallest, indivisible clay nanoparticles such as platelets and to uniformly disperse the platelets in the polymer all at a relatively low cost.

Clays can be organically modified to aid in delamination and/or dispersion. For example, in each of U.S. Pat. No. 6,518,324, U.S. Pat. Application No. 2007/0072991, U.S. Pat. Application No. 2007/197709, U.S. Pat. Application No. 2007/0227748, and G. Harikrishnan, T. Umasankar Patro, and D. V. Khakhar, *Polyurethane Foam—Clay Nanocomposites: Nanoclays as Cell Openers*, Ind. Eng. Chem. Res., 2006, 45, 7126-7134 the clay was organically modified to delaminate clay platelets. Generally, clays can be organically-modified by associating an ion incorporating a lipophilic group with the ionic charge on the clay surface. The use of organically modified clays, however, significantly increases the cost of the finished product and potentially decreases or eliminates certain polymer properties such as fire resistance. Although the above-referenced patents and publications were directed toward polyurethanes, *Polymer Nanocomposites, Processing, Characterization and Applications; Thermoset Nanocomposites for Engineering Applications* and the article "*Twenty Years of Polymer-Clay Nanocomposites*," by Okada et al., Macromolecular Materials and Engineering, 2006, 291, 1449-1476 indicate that organic modification of clays is also used for forming nanocomposites with other polymers.

In addition to organically modifying clays, a solvent may used to aid with nanodispersion. The use of solvents, however, has limited applicability and compatible polymer-silicate solvent systems are not always available. Furthermore, solvent removal can be very expensive and environmentally damaging.

Another technique that is gaining attention is direct polymer melt intercalation. With direct polymer intercalation, the polymer and silicate are mixed and the mixture is heated above the softening point of the polymer, usually using an extruder. This technique, however, has limited applicability to polyurethane products as most of them are thermosets.

Thus there is a continuing need for making polyurethane nanocomposites with reduced or eliminated organic modification by lipophilic counter ions of the clay, use of solvents, or both.

SUMMARY

According an embodiment of the present invention, an inorganic clay that has not been modified by treatment with a lipophilic counter ion is pre-exfoliated, pre-delaminated, or both is mixed with an organic isocyanate to form a nanodispersion. Thereafter, the isocyanate nanodispersion may be reacted with an isocyanate-reactive material to form a polyurethane nanocomposite.

DETAILED DESCRIPTION

Figure 1:
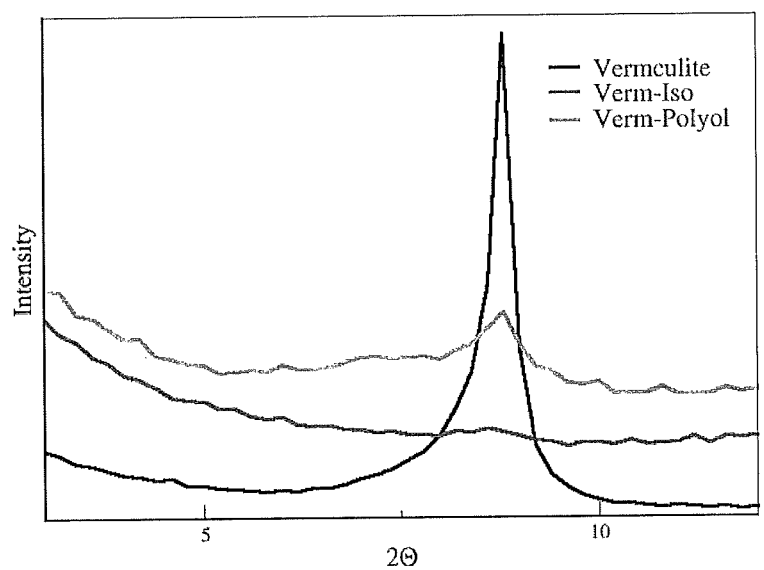
FIG. 1 illustrates x-ray diffraction traces for vermiculite and certain dispersions containing vermiculite.

In an embodiment of the present invention, nanoparticles dispersed in an isocyanate are added to an isocyanate-reactive material such as a polyol to form a polyurethane nanocomposite. Nanoparticles, such as clay nanoparticles, have at least one dimension in the nanometer (nm) range, for example 100 nm or less. Clay nanoparticles dispersed at a molecular level in a polymer matrix yield ultra-large interfacial area per unit volume. This may contribute to a dramatic improvement of certain polyurethane properties even if a relatively low content of nanoclay particles are added to a polyurethane system.

Generally, nanoclays are stacks of layered silicates with each silicate layer having thickness of about one nm and the other two dimensions being about 30-1000 nm. The smallest, indivisible clay nanoparticles may be platelet- or cylinder-shaped. The space between the internal faces of adjacent clay platelet layers is the gallery or interlayer, which may be occupied by ionic materials. The sum of the gallery distance and platelet thickness is the "$d_{001}$" basal spacing (platelet spacing), which can be measured by X-ray diffraction. The interfacial area of nanoclays may be greater than 700 m²/g and there may be a large aspect ratio, such as greater than 50, although embodiments are not so limited. It should be noted that embodiments of the invention are not limited to use of nanoclays having particular characteristics such as shape or dimension, aside from being a nanoparticle.

Clay platelets may be stacked into depths of hundreds or more to form primary particles; primary particles may be stacked together to form aggregates or granules, which may be 10-30 microns in size. This stacking of nanoclay layers may be caused by ionic forces along with Van der Waals interactions.

In some embodiments, nanodispersions may be made with natural mineral inorganic clays and in other embodiments, artificial clays may be used. Neither natural nor artificial clays need to be modified by association with a counter ion such as an onium ion (e.g. ammonium, phosphonium, oxonium, and sulfonium) that incorporates a lipophilic group such as a long hydrocarbon (e.g. greater than $C_8$) or oligoalkyleneoxides to achieve nanodispersion according to embodiments of the present invention. In fact, in most embodiments, the clays used lack such modification. Examples of suitable inorganic clays include, without limitation, smectites (aluminum silicates), vermiculite (magnesium-aluminum-iron silicate), and halloysite (aluminum silicate). Smectite clays include montmorillonite, saponite, bentonite, beidellite, montronite, hectorite, and stevensite. One example of a synthetic silicate clay material is laponite.

In a preferred embodiment, vermiculite is the clay of choice. Vermiculite is a hydrated magnesium-aluminium-iron silicate with a melting point of 1315° C. and a sintering temperature of 1260° C. It is non corrosive, non combustible, non allergenic, odorless, resistant to attack by micro organisms, and does not swell when water wetted. Vermiculite has the unusual attribute that when heated at temperatures above 450° C., it exfoliates or expands into worm-like particles. This exfoliation may be due to the moving apart of the layers due to the interlayer generation of steam, which may be due to the release of crystalline water of hydration at such elevated temperatures. In another preferred embodiment, laponite is clay of choice. Laponite's chemical structure is $Na_{0.33}[Mg_{2.67}Li_{0.33}Si_4O_{10}Fe(OH)_2]$ with an aspect ratio of 25-30.

In some embodiments, the clay structure may be pre-exfoliated prior to dispersion. Generally, pre-exfoliation is an expansion process in which the bulk density of the clay superstructure is decreased and groups of platelets are de-aggregated into smaller platelet groups separated by "free-volume." In other embodiments, the clay structure may be delaminated or pre-exfoliated and delaminated prior to dispersion. Generally, delamination refers to the separation of individual platelets and results in an increase in or disappearance of the "$d_{001}$" basal spacing.

Pre-exfoliation and/or delamination of a clay structure may be accomplished by one or more of known method such as heat treatment, dispersion in water, dispersion in an acidified aqueous medium to name a few. The process and the principles of heat treatment are described in U.S. Pat. Nos. 4,400,297 and 4,826,628; Midgley, H. G. and Midgley, C. M. 1960 "*The mineralogy of some commercials vermiculites*". Clay Min. Bull., 4(23):142-150, and Couderc, P. and Douillet, Ph. 1973 "*Les vermiculite industrielles: exfoliation, caracteristiques, mineralogiques et chimques*" Bull. Soc. Fr. Ceram., 99:51-59. Generally, with heat treatment, the clay is heated to elevated temperatures to convert internally-trapped moisture into steam and consequently expand the clay granules into concertina-shaped granules. This exfoliation results in the formation of pores between groups of platelets and reduces the bulk density. The heat treatment process may also lead to some delamination as evidenced by a reduction in the "$d_{001}$" basal spacing.

Clay may also be pre-exfoliated, delaminated, or both by dispersion in water. Such pre-dispersion may lead to delamination as evidenced by disappearance of the "$d_{001}$" x-ray diffraction peak.

An acidified aqueous medium may be used to pre-exfoliate, delaminate, or both clay. For example, clay, which may be heat-treated, is stirred under high shear in an aqueous acidic medium. It is believed that the acid treatment removes interlayer cations from the clay and delivers a higher degree of hydration while the shearing action deagglomerates granules into groups of platelets. Partial or complete delamination of the clay platelets may occur in this process. The process is described in U.S. Pat. No. 4,400,297.

In an embodiment, the pre-exfoliated and/or delaminated clay is dispersed in an isocyanate. As with clay, the isocyanate component does not have to be modified by an organic onium ion, such as ammonium, phosphonium, oxonium, or sulfonium ion to enable nanodispersion. In fact, in a preferred embodiment the isocyanate is not modified by such an organic onium ion. Suitable isocyanates include organic isocyanates, which may be unmodified or which may have undergone certain, non-organic onium ion, modifications. For example, suitable unmodified polyisocyanates include, without limitation, aromatic and aliphatic polyisocyanates such as 2,4- and 2,6-toluene-diisocyanates, 2,4- and 2,6-methylcyclohexylenediisocyanate, isophoronediisocyanate (IPDI), 2,4'-, 4,4'- and 2,2'-diphenylmethane-diisocyanates (MDI), polymethylene polyphenyl polyisocyanate (PMDI), and hexamethylene diisocyanate (HDI). Polyisocyanates modified with various groups containing ester, urea, biuret, allophanate, carbodiimide, isocyanurate, uretdione, and urethane groups may also be suitable for use in embodiments of the present invention.

In a preferred embodiment, the isocyanate is one or more isocyanates of the methylene diphenyl diisocyanates (MDI) series. In an embodiment, the isocyanate is a mixture of one or more diphenylmethane diisocyanate isomers with one or more higher molecular weight oligomers of the MDI series polymethylene polyphenyl polyisocyanates. In some embodiments, the isocyanate may include one or more modified isocyanates such as those containing one or more of ester group, urea group, biuret group, allophanate group, carbodiimide group, isocyanurate group, uretdione group, or urethane groups.

Prior to dispersing nanoclay into isocyanate, the clay mineral may be reduced in size. For example, in an embodiment the size of the nanoclay may be reduced to 1-100 microns.

Techniques that may be used to reduce size include powder grinding or milling techniques such as ball mill, hammer mill, vibration mill, pin mill, jet mill, or mixer, although embodiments are not so limited. The resultant fine powder may be dried to remove any free water from the nanoclay using any known technique including spray drying, vacuum drying, and flash drying, although embodiments are not limited in this respect.

The amount of clay dispersed into isocyanate may depend on the polyurethane property to be enhanced, on viscosity limitations, if any, or both. For example, some processing equipment used to make polyurethane products may only be able to handle liquids of viscosity below 100 poises (P), and as such, may limit the amount of clay that can be added to the isocyanate. Given these considerations, in some applications the amount of clay dispersed into the isocyanate is between 0 to about 30% by weight of the total isocyanate. In other applications, the amount of clay dispersed into the isocyanate is between 0.5% to about 20% or between 1.0% to about 15% by weight of the total isocyanate weight.

Once the desired amount of pre-exfoliated and/or delaminated clay is determined, it is mixed with the isocyanate to form a clay-isocyanate nanodispersion. The mixing of the pre-exfoliated and/or delaminated clay with the isocyanate may play an important role in delamination of the clay by isocyanate. For example, the type and intensity of mixing and the mixing sequence, conditions, or both may affect the dispersion of the clay. Thus, different clay-isocyanate combinations may have different mixing requirements. Generally, any suitable powder-liquid mixing processes may be used to mix the pre-exfoliated and/or delaminated clay and isocyanate such as, and without limitation, low to high shear mechanical mixing, sonication, extrusion, and magnetic stirring. Furthermore, a particular time period and frequency of ultrasound, together with the shear rate, speed, and duration of mechanical mixing may also be used for mixing and it may influence the state of clay-isocyanate nanodispersion. Microwaves, infrared radiation, or other electromagnetic radiation may also assist in achieving dispersion and delamination of the clay particles. In a particular embodiment, sonication followed by gentle stirring may be used to disperse 38 micron sized, dried, exfoliated vermiculite within poly-MDI (PMDI) of viscosity 50-1000 cP.

The degree of dispersion of the nanoclay in the isocyanate may depend upon the degree of clay exfoliation, delamination, or both, the maintenance or improvement of nanoparticle dispersion upon reactive blending with isocyanate, and the reaction of isocyanate groups with isocyanate-reactive groups on the surface, the edges, or both of the clay platelets. According to an embodiment of the present invention, these factors may contribute to storage stability of a clay-isocyanate nanodispersion, to enhanced property benefits in a derived polyurethane nanocomposite, or to both. In an embodiment of a delaminated nanodispersion, interlayer platelet spacing may be greater than 7 nm. This may be determined via X-Ray diffraction by the near or total absence of reflection peaks from the nanoclay. In contrast, in intercalated isocyanate-clay system, i.e., only a few isocyanate chains are between the clay platelets, and the interlayer spacing is approximately 1.5 to 6 nm, depending on the clay and the isocyanate. Furthermore, the state of clay dispersion within the isocyanate and storage stability of the isocyanate-clay nanodispersions may be the result of the extent to which isocyanate reacts with hydroxyl groups on the surface, edges, or both of the clay platelets and it may also contribute to the performance of the derived polyurethane nanocomposite. Fourier-transform infrared (FTIR) spectroscopy comparison of clay-isocyanate dispersions with that with clay alone can be used as a technique to characterize this reaction.

An embodiment of a clay-isocyanate nanodispersion may be used to make a polyurethane nanocomposite. Generally, an embodiment of a clay-isocyanate nanodispersion is reacted with an isocyanate-reactive material or substrate to form the desired polyurethane nanocomposite. This reaction may take place in presence of one or more additives such as catalyst, fire retardant, blowing agent, water, surfactant, coupling agent, flow modifier, UV stabilizer, antioxidant, and fillers, although embodiments are not so limited. Isocyanate-reactive materials may be hydroxyl group-containing compounds (polyols) useful in the preparation of polyurethanes such as simple aliphatic glycols, dihydroxy aromatics, bisphenols, a hydroxyl-terminated polyethers, polyesters, and polyacetals, just to name a few Although embodiments are not limited to a particular isocyanate-reactive material, of particular interest are the hydroxyl-terminated polyoxyalkylene and polyester polyols, and mixtures thereof.

Any type of polyurethane nanocomposites may be produced by reacting an embodiment of a clay-isocyanate dispersion with isocyanate-reactive material. For example, elastomers, thermoplastic polymers, and/or thermo set polymers may each be made according to an embodiment. Furthermore, these three types of polymers may be in the form of foam, a film, a sheet, a tube, a coating, a paint, an adhesive, a casting resin, or a compression molding. The relative amount of an embodiment of a clay-isocyanate dispersion, the isocyanate-reactive material, and one or more optional additives depends on both the type and the form of the polymer.

In a particular embodiment, a coating may be formed by reacting an embodiment of a nanoparticle-isocyanate nanodispersion and an isocyanate-reactive material. Such coatings may be reactive and may be solvent-free or solvent-containing and they may be two components or one. Moreover, one or more additive such as, a catalyst, a solvent (except in a solvent-free coating), a cross-linking agent, a light stabilizer, and an antioxidant may be added to the isocyanate-reactive material or the reaction mixture, or both. The barrier, abrasion performance, or both properties of coating made using an embodiment of the clay-isocyanate nanodispersion may be superior than those made using an isocyanate alone.

In other particular embodiments, open-cell or closed-cell or flexible or rigid foams may be made. In a preferred embodiment, rigid, closed cell foams are made. And in another preferred embodiment, a blowing agent is trapped within the closed cells of a rigid foam. In some instances, the closed cell content of a rigid foam may be greater than 80%, greater than 90%, or greater than 95%. An embodiment of a closed cell foam may be made by reacting an embodiment of a clay-isocyanate nanodispersion with a isocyanate-reactive material in presence of one or more optional additives known in the art of rigid isocyanate-based insulation foam technology. For example, optional additives include physical and chemical blowing agents, fire retardants, catalysts, surfactants, smoke suppressants, pigments, fillers, reinforcements, dyes, antistatic agents, biocidal agents, and the like, which may be tailored to given application. Those skilled in the art should appreciate the proportions of these additives in an overall reaction system, the appropriate placement of each in the reaction system, and the conditions when they are required.

Of the optional additives, those that are used in many embodiments of the invention include blowing agents, catalysts, and surfactants, although embodiments are not so limited. Blowing agents include physical blowing agents and chemical blowing agents. Physical blowing agents include hydrocarbons (HCs), hydrofluorocarbons (HFCs), and hydrochlorofluorocarbons (HCFCs). Commonly used HCs include isomers of pentane, such as n-pentane, iso-pentane, and cyclopentane, commonly used HFCs include 1,1,1,3,3-pentafluoropropane (HFC-245fa); 1,1,1,3,3-pentafluorobutane (HFC-365mfc); 1,1,1,2-tetrafluoroethane (HFC-134a); and 1,1-difluoroethane (HFC-152a), and commonly used HCFCs include HCFC-141b ($CCl_2FCH_3$) and HCFC-22 ($CHClF_2$), although embodiments are not limited to these particular examples. Chemical blowing agents include, without limitation, water or other components that release $CO_2$ when reacted with isocyanate such as carboxylic acid compounds. In some embodiments, the amount of blowing agent in the foam formulation gives a density of from 1-3 $lb/ft^3$, and preferably 1.5-2.5 $lb/ft^3$.

Catalysts that may be used in an embodiment of the present invention include, without limitation, tertiary aliphatic amines, and metal organic compounds. Examples of the latter include various carboxylate esters of tin and alkali salts of carboxylic acids. Tertiary amine catalysts are usually present. Surfactants that may be used in embodiments of the present invention include, without limitation, silicone surfactants, which stabilize the cell structure of the foam to produce predominantly closed cells. Silicone surfactants may also be important in the control of cell size and regularity. Many examples of suitable catalysts and surfactants are known in the art, and the specific identities of these compounds, as well as how they are used, will be known to those skilled in the art.

In an embodiment of a closed cell rigid foam reaction system, the components may be processed into foam under conditions that provide for an Index from 0.8 to 15. Index is the ratio of isocyanate (NCO) group equivalents to isocyanate reactive group equivalents and it is sometimes expressed as a percent. In other embodiments, the Index range is from 1 (100%) to about 6 (600%), in still other embodiments the Index range is from 1.5 to 4.5, and a preferred embodiment, the Index range is from 2 to 4. If a system is processed at an Index of greater than 1.5, it is preferred to include, in the catalyst package, a catalyst suitable for converting isocyanate groups into isocyanurate groups. Rigid foams prepared at Indices greater than 2 are generally called polyurethane-polyisocyanurate foams.

To prepare a foam according to an embodiment of the present invention, two components, a clay-isocyanate nano-dispersion component, and an isocyanate-reactive component are mixed together. Furthermore, when used, additives such as a surfactant or catalyst may be added to the isocyanate-reactive component before reacting this component with the isocyanate component. The two reactive components may be mixed by hand or machine mixing. The reaction mixture can be molded, laminated, sprayed, or allowed to rise freely as a free-rise foam.

EXAMPLES

The following examples illustrate particular embodiments; the scope of the disclosure and claims are not limited thereto.
Materials use in Examples 1 and 2:
Vermiculite: Pre-exfoliated vermiculite, Grade NO. 3, CAS no. 1318-00-9, from Sigma Aldrich.
Laponite® JS: A synthetic Smectite clay supplied by Southern Clay Products (SCP).
Rubinate® M: A polymeric polyphenylene polymethylene polyisocyanate (PMDI) with a free isocyanate (—NCO) group content of about 31% by weight and a viscosity at 25° C. of about 170 cPs. It has a number averaged isocyanate group functionality of about 2.7 and is available from Huntsman.
Jeffol® SD 361: A sucrose diethylene glycol initiated polyether liquid polyol with OH number of 360 from Huntsman.
Polycat® 8: N,N-dimethyl cyclohexylamine from Air Products.
Polycat® 5: Pentamethyldiethylenetriamine from Air Products.
Tegostab® 8404: A silicone surfactant from Evonik.
Cyclopentane: Pure grade cyclopentane from Sigma Aldrich.

Example 1

In this example, the coarse pre-exfoliated vermiculite was ground in a ball mill for several hours and was sieved to a particle size less than 38 microns. The resultant fine powder was dried at 80° C. for 48 hours in a vacuum oven. Thereafter, the powder was separately dispersed in polyol and in isocyanate. For example, referring to FIG. 2, two different percentage weights of clay were added to polyol and two different percentage weights of clay were added to the isocyanate. Each sample was heated while stirring.

The polyol-vermiculite blends and the isocyanate clay blends were put in closed containers and stirred at 1000 rpm at approximately 50° C. The polyol-vermiculite blends were stirred for one hour whereas the isocyanate clay blends were stirred for 30 minutes. The isocyanate-vermiculite blends were stirred for 30 minutes to reduce the chance of atmospheric moisture reacting with the isocyanate. Each vermiculite mixture was ultrasonicated for 6 hours and cooled to room temperature. Referring to Table 1, below, the isocyanate-reactive component is shown. This component was prepared for mixing with the isocyanate-vermiculite blends by mixing for 15 seconds at a speed of 2500 rpm. For the polyol-vermiculite blends, the ingredients listed in Table 1 that were not already present were added to the polyol-vermiculite blends by mixing for 15 seconds at a speed of 2500 rpm.

TABLE 1

| Isocyanate-Reactive Component | Weight (gm) |
|---|---|
| Jeffol ® SD361 | 100 |
| Polycat ® 8 | 2.0 |
| Polycat ® 5 | 0.3 |
| Tegostab ® 8404 | 1.5 |
| Cyclopentane | 9.0 |
| Water | 1.8 |

(Rubinate® M was used as the isocyanate component for each foam of Example 1; an isocyanate index of 110 was used in all cases.)

The calculated quantity of isocyanate was added to the polyol-vermiculite blends and the calculated quantity of the isocyanate-vermiculite nanodispersions were added to the vermiculite-free isocyanate-reactive component. At room temperature, each blend was mixed for 8 seconds at a speed of 2500 rpm and was poured into a wooden mold of dimension 33×33×7 $cm^3$. After pouring, the molds were quickly closed and the foams were allowed to fill the molds. The foams were demolded after 20 minutes. Free rise foams were also made in a 16 oz paper cup to determine string and rise times.

Referring to FIG. 1, X-ray Diffraction (XRD) patterns illustrating the dispersion of vermiculite in polyol and isocyanate respectively are shown. The sharp peak with the highest intensity illustrates the XRD pattern for vermiculite. The peak represents the $d_{001}$ basal spacing (1.12 nm) for the unmodified vermiculite. In contrast, the line without a sharp peak illustrates the XRD pattern for a vermiculite-isocyanate blend. The XRD pattern between the two other patterns illustrates the XRD pattern for the vermiculite-polyol blend. The disappearance of the sharp vermiculite peak for the isocyanate-vermiculite dispersion indicates that vermiculite has been delaminated to form a nanodispersion. The small diffraction peak of the polyol-vermiculite blend suggests that some vermiculite has been delaminated, but non-delaminated vermiculite is still present in the blend.

Figure 2A:
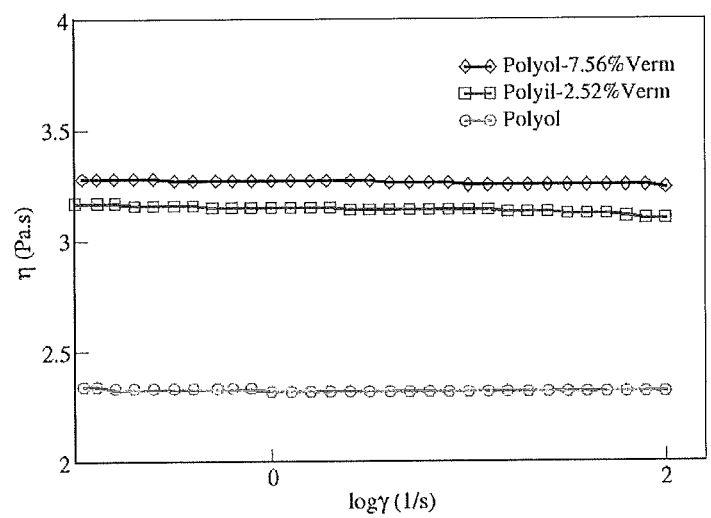
FIG. 2 illustrates the rheology of certain vermiculite blends as compared to vermiculite-free blends.
Figure 2B:
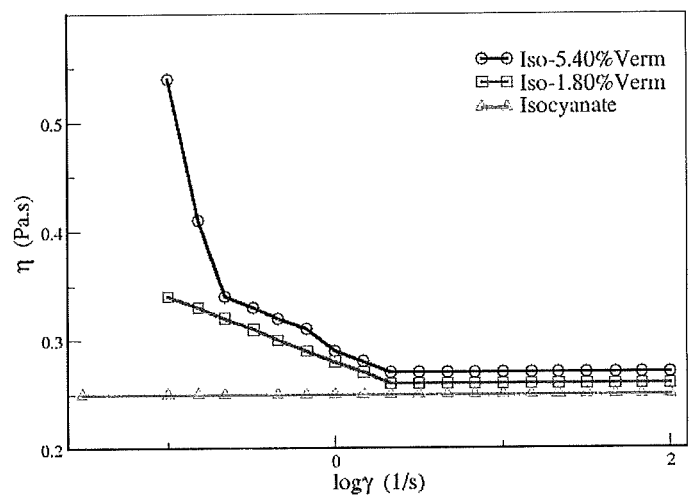

FIGS. 2a and 2b show variations of viscosity with shear rate for the different concentrations of vermiculite blended with the polyol or isocyanate respectively. We used parallel plate rheometry (rheometer Model AR G2 from TA Instruments) to investigate rheology of the various blends.

As is shown in FIG. 2A, there is an increase in viscosity when vermiculite is incorporated into polyol, but the increased viscosity did not present a barrier to subsequent processing. Referring to FIG. 2b, there is also an increase in viscosity in the isocyanate-vermiculite blends, which also was not a barrier to processing. But unlike the polyol-vermiculite blends, the isocyanate-vermiculite blends show a slight shear thinning. This effect is beneficial for industrial environments.

Figure 3:
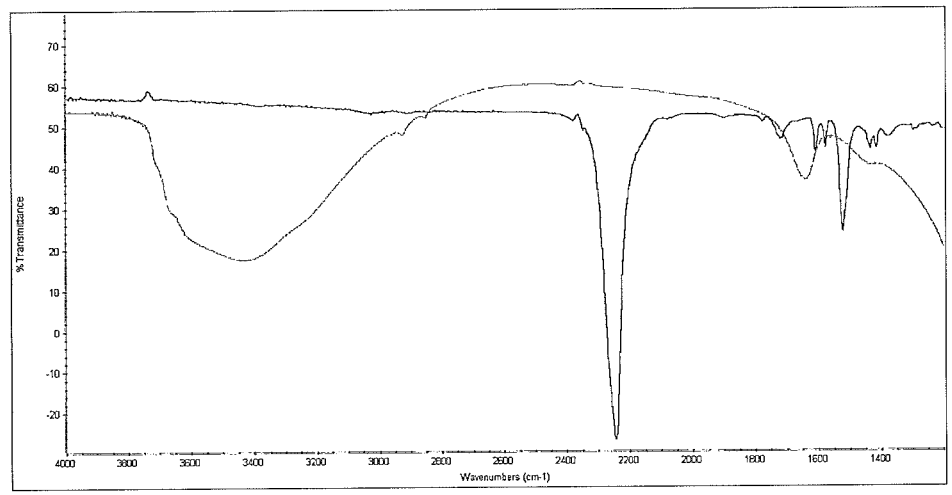
FIG. 3 illustrates Fourier Transform Infra-Red Spectroscopy for vermiculite and an isocyanate blended with vermiculite to form a nanodispersion.

Referring to FIG. 3, Fourier Transform Infra-Red Spectroscopy (FTIR) spectra are shown. The spectrum with the peak in the range 3000-3800 cm$^{-1}$ is the spectrum for vermiculite and the spectrum without such a sharp peak is the spectrum for an isocyanate-vermiculite blend. Without being bound by theory, the absence of such peaks in the isocyanate-vermiculite blend suggests that hydroxyl groups (both structural and H—OH) present on the clay have reacted with the —NCO groups of isocyanate. A tethering of vermiculite to isocyanate may cause or contribute to the increased delamination of vermiculite in isocyanate as compared to that in polyol.

As is shown in Table 2, below, thermal conductivity values of vermiculite nanocomposite rigid polyurethane foams are better than the foam without a nanoclay dispersion. That is, in comparing the values in Table 2, it is evident that vermiculite nanocomposite foams have lower initial thermal conductivities.

TABLE 2

| Vermiculite (% wt) | Thermal conductivity (mW/mk) |
|---|---|
| None | 0.0268 |
| 1 (PMDI) | 0.02534 |
| 3 (PMDI) | 0.02433 |

Thus, according to the parameters set forth for this first example, isocyanate may be reactive with pre-exfoliated vermiculite to form reactive nanodispersions and these nanodispersions may be used to synthesise rigid polyurethane nanocomposite foams with properties, such as enhanced k-factor insulation values that are superior to foams devoid of such nanocomposite. Furthermore, the rigid polyurethane foam nanocomposite fondled by dispersing the pre-exfoliated vermiculite in polyol shows incomplete delamination whereas the same vermiculite dispersed in isocyanate appears to be almost fully delaminated if not fully delaminated. It is surprisingly found that use of clay-isocyanate nanodispersion improves the insulation value of the closed cell rigid foams as compared to those made without using nanoclay.

Example 2

As with Example 1, the formulation of Table 1 was the formulation chosen for the isocyanate-reactive component when making the nanocomposites of Example 2. Likewise, Rubinate® M at an isocyanate index of 110 was used in each case. The clay used in Example 2, however, was laponite JS, a synthetic smectite clay supplied by Southern Clay Products.

To exfoliate the clay, a small quantity of Laponite JS (less than 5 wt %) was dispersed in distilled water. The blend was stirred magnetically for 30 minutes to yield a clear suspension. This suspension was kept standing for 2 days. After that, the water was evaporated by heating in an aluminum container to give exfoliated laponite; the resulting platelets, however, showed some physical aggregation. The exfoliated laponite (hereafter referred as x-laponite) was ground with a mortar and pestle and sieved through a 38-micron sieve. The sieved x-laponite was dispersed in both polyol and isocyanate according to the procedure described in Example 1.

Figure 4:
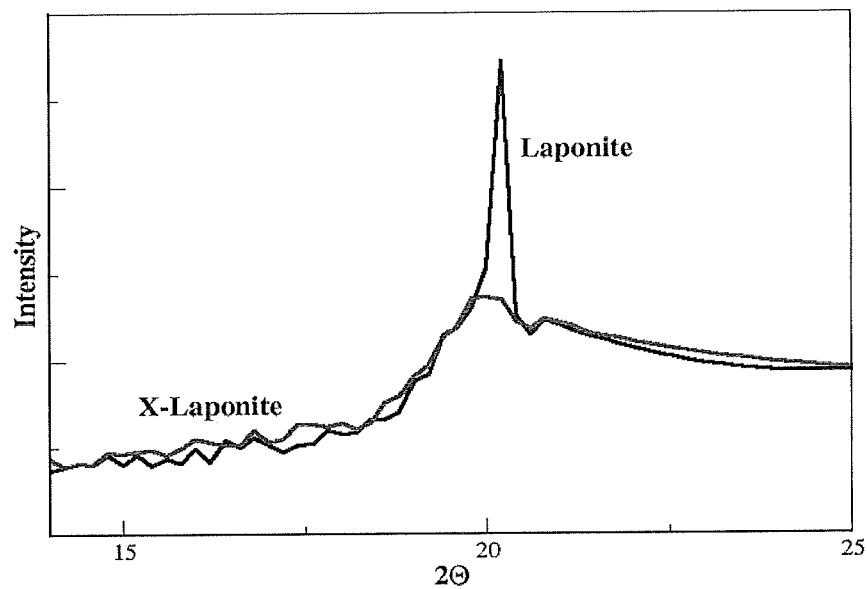
FIG. 4 illustrates x-ray diffraction traces for laponite and certain dispersions containing laponite.

Referring to FIG. 4, the XRD traces of laponite and x-laponite are shown. The trace for the untreated laponite has a sharp peak. The peak represents the $d_{001}$ basal spacing (1 nm) for the unmodified laponite. In contrast, the trace for the x-laponite shows a diminished peak, which suggests that there is a substantial exfoliation of the platelets. That is, the exfoliated platelets show some physical aggregation, but because the intensity of the $d_{001}$ peak is low, it suggests that only a few clusters of non-delaminated platelets are present after dispersing in water.

Figure 5A:
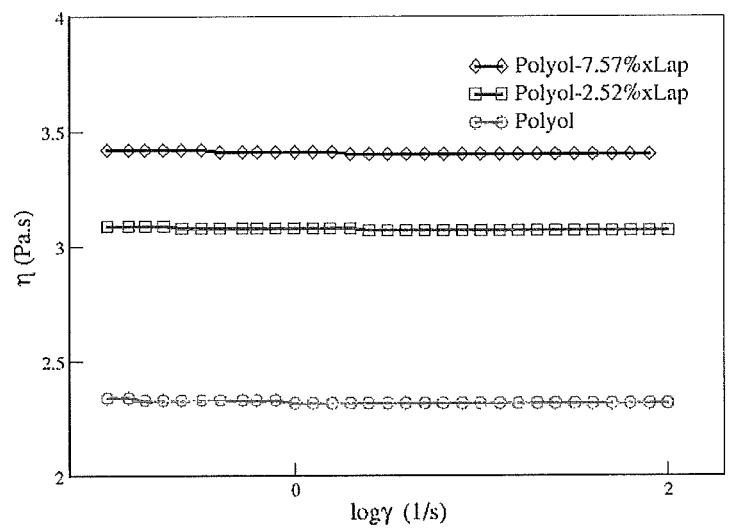
FIG. 5 illustrates the rheology of certain laponite blends as compared to laponite-free blends.
Figure 5B:
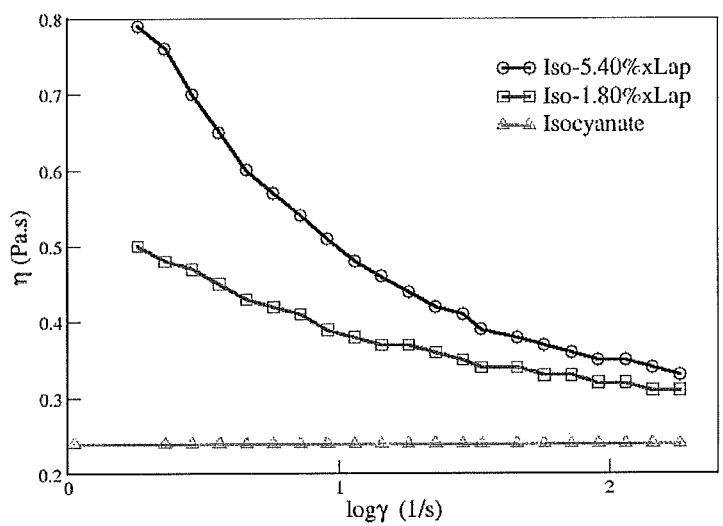

Referring to FIGS. 5a and 5b, the viscosity change with shear rate of x-laponite blended with both polyol and isocyanate, respectively are shown. Investigation of rheology was performed the same as with Example 1. In both FIGS. 5a and 5b there is an increase in viscosity upon incorporation of increasing amounts of x-laponite. In both cases, the increase of viscosity is not thought to be high enough to limit process ability. In FIG. 5a, the x-laponite blend in polyol shows a Newtonian behavior, and in FIG. 5b, the isocyanate-x-laponite blend shows a slight shear thinning nature with clay. The relatively small increase in high shear viscosity in the case of clay-isocyanate dispersion is a potential benefit for industrial applications.

As is shown in Table 3, below, thermal conductivity values of laponite nanocomposite foams are shown. Thermal conductivities were measured by a Foxpro analyzer. The thermal conductivities of both nanocomposite foams are better than that of the conventional foam, without laponite. Without being bound by theory, it is thought that the better thermal conductivity is due to the smaller cells obtained by bubble nucleation induced by clay.

TABLE 3

| Exfoliated -Laponite (% wt) | Thermal conductivity (mW/mk) |
|---|---|
| None | 0.0269 |
| 1 (PMDI) | 0.0255 |
| 3 (PMDI) | 0.0250 |

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
   adding a pre-exfoliated inorganic clay to an isocyanate, said pre-exfoliated inorganic clay is free from modification by an organic counter ion and has not been introduced to an aqueous acidic medium;

causing the inorganic clay to delaminate to form a clay nanodispersion;

mixing said clay nanodispersion with an isocyante-reactive component and a blowing agent to form a reactive mixture; and allowing the reactive mixture to foam thereby forming a rigid polyurethane foam having a closed cell content greater than 80%.

2. The method of claim 1 wherein adding a pre-exfoliated inorganic clay to an isocyanate includes adding a naturally occurring inorganic clay to a diisocyanate.

3. The method of claim 2 wherein adding a pre-exfoliated inorganic clay to an isocyanate includes adding a synthetic inorganic clay to a diisocyanate.

4. The method of claim 2 including pre-exfoliating the inorganic clay.

5. The method of claim 1, wherein the blowing agent comprises a physical blowing agent, a chemical blowing agent, or combinations thereof.

6. The method of claim 1, wherein the blowing agent comprises a hydrofluorocarbons, a hydrochlorofluorocarbon, water, or combinations thereof.

7. The method of claim 6, wherein the blowing agent comprises pentane, such as n-pentane, iso-pentane, cyclopentane, 1,1,1,3,3-pentafluoropropane, 1,1,1,3,3-pentafluorobutane, 1,1,1,2-tetrafluoroethane, 1,1-difluoroethane, or combinations thereof.

8. The method of claim 1, wherein the organic counter ion is a lipophilic counter ion.

9. The method of claim 1, wherein the isocyanate is not modified by an organic onium ion.

10. A method comprising:

adding a pre-exfoliated inorganic clay to an isocyanate, said pre-exfoliated inorganic clay is free from modification by an organic counter ion and has not been introduced to an aqueous acidic medium;

causing the inorganic clay to delaminate to form a clay nanodispersion by use of a method comprising sonication;

mixing said clay nanodispersion with an isocyante-reactive component and a blowing agent to form a reactive mixture; and allowing the reactive mixture to foam thereby forming a rigid polyurethane foam having a closed cell content greater than 80%.

11. The method of claim 10 wherein adding a pre-exfoliated inorganic clay to an isocyanate includes adding a naturally occurring inorganic clay to a diisocyanate.

12. The method of claim 11 wherein adding a pre-exfoliated inorganic clay to an isocyanate includes adding a synthetic inorganic clay to a diisocyanate.

13. The method of claim 11 including pre-exfoliating the inorganic clay.

14. The method of claim 10, wherein the blowing agent comprises a physical blowing agent, a chemical blowing agent, or combinations thereof.

15. The method of claim 10, wherein the blowing agent comprises a hydrofluorocarbons, a hydrochlorofluorocarbon, water, or combinations thereof.

16. The method of claim 15, wherein the blowing agent comprises pentane, such as n-pentane, iso-pentane, cyclopentane, 1,1,1,3,3-pentafluoropropane, 1,1,1,3,3-pentafluorobutane, 1,1,1,2-tetrafluoroethane, 1,1-difluoroethane, or combinations thereof.

17. The method of claim 10, wherein the organic counter ion is a lipophilic counter ion.

18. The method of claim 10, wherein the isocyanate is not modified by an organic onium ion.

19. The method according to claim 1, wherein the pre-exfoliated inorganic clay is reduced in size prior to adding the pre-exfoliated inorganic clay to the isocyanate.

20. The method according to claim 19, wherein the pre-exfoliated inorganic clay is reduced to a size ranging from 1-100 microns.

21. The method according to claim 10, wherein the pre-exfoliated inorganic clay is reduced in size prior to adding the pre-exfoliated inorganic clay to the isocyanate.

22. The method according to claim 21, wherein the pre-exfoliated inorganic clay is reduced to a size ranging from 1-100 microns.

23. The method according to 1, wherein the rigid polyurethane foam has a closed cell content greater than 90%.

24. The method according to claim 1, wherein the rigid polyurethane foam has a closed cell content greater than 95%.

25. The method according to 10, wherein the rigid polyurethane foam has a closed cell content greater than 90%.

26. The method according to claim 10, wherein the rigid polyurethane foam has a closed cell content greater than 95%.

* * * * *